United States Patent
Bhattacharya et al.

(10) Patent No.: US 11,392,541 B2
(45) Date of Patent: Jul. 19, 2022

(54) DATA TRANSFER USING SNAPSHOT DIFFERENCING FROM EDGE SYSTEM TO CORE SYSTEM

(71) Applicant: HEWLETT PACKARD ENTERPRISE DEVELOPMENT LP, Houston, TX (US)

(72) Inventors: Suparna Bhattacharya, Karnataka (IN); Lin A. Nease, Granite Bay, CA (US); Peter F. Corbett, Westborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 166 days.

(21) Appl. No.: 16/361,310

(22) Filed: Mar. 22, 2019

(65) Prior Publication Data
US 2020/0301881 A1    Sep. 24, 2020

(51) Int. Cl.
*G06F 16/00* (2019.01)
*G06F 16/11* (2019.01)
(Continued)

(52) U.S. Cl.
CPC ........ *G06F 16/128* (2019.01); *G06F 16/1756* (2019.01); *G06F 16/185* (2019.01);
(Continued)

(58) Field of Classification Search
CPC ............... G06F 16/128; G06F 16/1756; G06F 16/9027; G06F 16/185; G06F 16/1734;
(Continued)

(56) References Cited

U.S. PATENT DOCUMENTS 6,643,670 B2   11/2003  Parham et al.
6,745,209 B2   6/2004   Holenstein et al.
(Continued)

FOREIGN PATENT DOCUMENTS

EP         1 845 448 A2  * 10/2007
WO    WO 2010/033552    *  3/2010
(Continued)

OTHER PUBLICATIONS

Robert Sheldon, "Why an edge computing platform benefits from HCI", available online at <https://searchconvergedinfrastructure.techtarget.com/tip/Why-an-edge-computing-platform-benefits-from-HCI?vgnextfmt=print>, Dec. 19, 2017, 2 pages.
(Continued)

*Primary Examiner* — Srirama Channavajjala
(74) *Attorney, Agent, or Firm* — Sheppard Mullin Richter & Hampton LLP

(57) ABSTRACT

A source system generates snapshots of collected data. The snapshots have respective associated time references. Responsive to a request from a target system for data collected over a time interval, the source system generates a subset of the data collected by determining a start snapshot and an end snapshot. The start snapshot and the end snapshot are determined as a pair of snapshots that have respective associated time references that are most closely spaced and are inclusive of the time interval. The source system determines a difference in the data included in the end snapshot and the start snapshot and provides the subset of the data as the difference in the data included in the end snapshot and the start snapshot.

19 Claims, 4 Drawing Sheets

(51) Int. Cl.

| | | |
|---|---|---|
| *G06F 16/901* | (2019.01) | |
| *G06F 16/174* | (2019.01) | |
| *G06F 16/185* | (2019.01) | |
| *G06F 16/40* | (2019.01) | |
| *G06F 16/50* | (2019.01) | |
| *G06F 16/70* | (2019.01) | |

(52) U.S. Cl.
CPC .............. *G06F 16/40* (2019.01); *G06F 16/50* (2019.01); *G06F 16/70* (2019.01); *G06F 16/9027* (2019.01)

(58) Field of Classification Search
CPC .... G06F 16/13; G06F 16/182; G06F 16/2329; G06F 11/1451; G06F 11/1469; G06F 11/1435; G06F 11/1448; G06F 11/1471; G06F 11/1464; G06F 16/40; G06F 16/50; G06F 16/70
See application file for complete search history.

(56) References Cited

U.S. PATENT DOCUMENTS

| | | | |
|---|---|---|---|
| 6,981,005 | B1 | 12/2005 | Cabrera et al. |
| 7,873,982 | B2* | 1/2011 | Smith .................... H04N 21/84 725/136 |
| 7,962,458 | B2 | 6/2011 | Holenstein et al. |
| 8,250,033 | B1* | 8/2012 | De Souter ........... G06F 16/1734 707/637 |
| 8,417,907 | B2 | 4/2013 | Urkude et al. |
| 8,478,799 | B2 | 7/2013 | Beaverson et al. |
| 8,788,769 | B2 | 7/2014 | Abercrombie et al. |
| 9,372,757 | B2 | 6/2016 | Cantwell et al. |
| 9,411,749 | B2 | 8/2016 | Boeuf et al. |
| 9,495,373 | B2 | 11/2016 | Gheith et al. |
| 9,705,730 | B1 | 7/2017 | Petri et al. |
| 9,798,791 | B1 | 10/2017 | Zhang et al. |
| 9,979,590 | B2* | 5/2018 | Marchese ........ G08B 13/19656 |
| 10,496,701 | B2* | 12/2019 | Abeloe ................. G06F 16/783 |
| 2002/0087552 | A1 | 7/2002 | Applewhite et al. |
| 2011/0060753 | A1* | 3/2011 | Shaked ................. G06F 16/285 707/769 |
| 2011/0191295 | A1* | 8/2011 | Ozdemir ................. G06F 16/00 707/639 |
| 2011/0213781 | A1 | 9/2011 | Hansel et al. |
| 2012/0030172 | A1 | 2/2012 | Pareek et al. |
| 2012/0166396 | A1* | 6/2012 | Yamagami .......... G06F 11/1471 707/676 |
| 2014/0040199 | A1* | 2/2014 | Golab .................... G06F 16/211 707/634 |
| 2014/0189576 | A1* | 7/2014 | Carmi .................. G06K 9/6204 715/781 |
| 2014/0258233 | A1 | 9/2014 | Ducott et al. |
| 2014/0337685 | A1* | 11/2014 | Baptist ................ H04L 67/1097 714/763 |
| 2015/0019495 | A1* | 1/2015 | Siden .................. G06F 11/1448 707/649 |
| 2015/0142745 | A1 | 5/2015 | Tekade et al. |
| 2015/0212893 | A1* | 7/2015 | Pawar ................. G06F 11/1448 707/649 |
| 2015/0212897 | A1* | 7/2015 | Kottomtharayil ... G06F 11/1464 714/20 |
| 2016/0014008 | A1 | 1/2016 | Metts et al. |
| 2016/0162550 | A1 | 6/2016 | Wang et al. |
| 2016/0202927 | A1 | 7/2016 | Klarakis et al. |
| 2016/0259794 | A1* | 9/2016 | Hickman ................ G06F 16/48 |
| 2017/0279901 | A1 | 9/2017 | Carricarte et al. |
| 2018/0109812 | A1* | 4/2018 | Tsai ...................... H04N 19/647 |
| 2018/0293137 | A1 | 10/2018 | Akutsu et al. |
| 2019/0155699 | A1* | 5/2019 | Luo ..................... G06F 11/1451 |

FOREIGN PATENT DOCUMENTS

| | | | |
|---|---|---|---|
| WO | WO2013035295 | A1 * | 3/2013 |
| WO | WO2014025594 | A1 * | 2/2014 |

OTHER PUBLICATIONS

Mouratidis et al., "Partially Materialized Digest Scheme: An Efficient Verification Method for Outsourced Databases", The International Journal on Very Large Data Bases, vol. 18, 2009, 19 pages.

Jason Collier, "Edge Computing and the Growth of Hyperconverged Solutions Over the Cloud in 2018", available online at <https://www.dataversity.net/edge-computing-growth-hyperconverged-solutions-cloud-2018/#>, Jan. 29, 2018, 6 pages.

Christy Pettey, "4 Factors Shape the Future of Hyperconverged Infastructure", available online at <https://www.gartner.com/smarterwithgartner/4-factors-shape-the-future-of-hyperconverged-infrastructure/>, Jun. 11, 2018, 10 pages.

Aung, O. et al., Back Up Azure Unmanaged VM Disks with Incremental Snapshots, (Web Page), Jan. 23, 2017, 7 Pgs.

Ranganathan, S., Edge to Core to Cloud Architecture for AI, (Research Paper), Aug. 2018, 13 Pgs.

Andrew Tridgell et al., "rsync", Jan. 28, 2018, 34 pages, retrieved from internet archive at <https://web.archive.org/web/20181213070402/https://download.samba.org/pub/rsync/rsync.html>.

Hernandez, Pedro, "Block Storage vs Object Storage: Difference & Uses," available online at <https://www.enterprisestorageforum.com/hardware/block-storage-vs-object-storage/>, May 9, 2018, 5 pages.

Jarret W. Buse et al., "DMAPI (Data Management API)", linux.org, Jul. 22, 2013, 3 pages, retrieved from internet <https://www.linux.org/threads/dmapi-data-management-api.8785/>.

Lennart Poettering, "casync—A tool for distributing fi le system images", Jun. 2017, 14 pages, retrieved from internet <http://0pointer.net/blog/casync-a-tool-for-distributing-file-system-images.html>.

Matt Passel et al., "How can I rsync a set of subdirectories?", Superuser, Jun. 2014, 3 pages, retrieved from internet <https://superuser.com/questions/775140/how-can-i-rsync-a-set-of-subdirectories>.

* cited by examiner

DATA TRANSFER USING SNAPSHOT DIFFERENCING FROM EDGE SYSTEM TO CORE SYSTEM

BACKGROUND

Computing systems may be connected over a network. Data may be transmitted between the computing systems over the network for various purposes, including processing, analysis and storage. The computing systems may include source systems, from which data is transmitted, and target systems, to which data is sent. Source systems may be at the edge of a network, and target systems may be at the core.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Data may be stored on a computing system, such as a server, a cluster of servers, a computer appliance, a workstation, a storage system, a converged or hyperconverged system, or the like. In some cases, it may be useful to transmit the data or a copy of the data from a source computing system, referred to as a source system, to another computing system, referred to as a target system, via any wired or wireless network connection. In particular, the source system may be at an edge of a network where data is generated, and the target system may be at the core (e.g., data center) where data is analyzed.

With the advent of Internet of Things (IoT) devices, such as cameras, smart appliances, smart wearable devices, etc., the data collected by source systems is increasing. While it may be desirable to transmit some of this data to a target system for analysis, the target system may only be interested in using a subset of the collected data. It would not be feasible or efficient to transmit all of the data collected by the source system to the target system.

In accordance with illustrative examples of the present disclosure, a subset of data collected by a source system is provided to a target system. The subset includes data collected by the source system over a time interval designated by the target system.

According to illustrative examples of the present disclosure, snapshots of data collected by a source system is generated. The snapshots have respective associated time references. Responsive to a request from a target system for data collected over a time interval, a subset of the data collected by the source system is generated. The subset is generated by determining a start snapshot and an end snapshot as a pair of snapshots that have respective associated time references that are most closely spaced and are inclusive of the time interval and determining a difference in the data included in the end snapshot and the start snapshot. The subset of the data collected by the source system includes the difference in the data included in end snapshot and the start snapshot.

Figure 1:
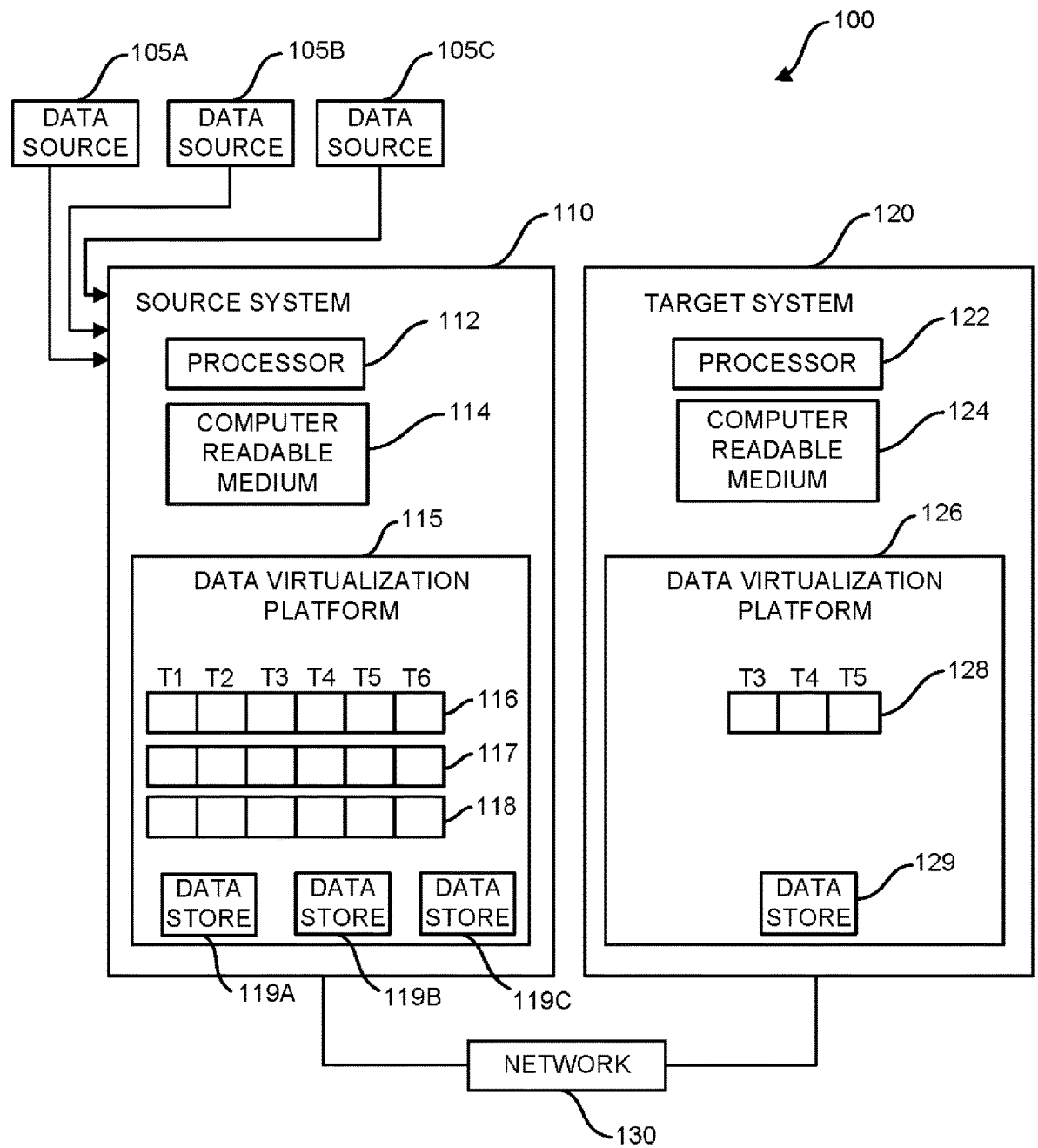
FIG. 1 conceptually illustrates a system including a source system and a target system, according to one or more examples of the disclosure.

An example of a system 100 including a source system 110 and a target system 120 is shown in FIG. 1. As shown in FIG. 1, the source system 110 communicates with the target system 120 via a network 130. The network 130 may include any wired or wireless network, such as a Wide Area Network (WAN). The source system 110 may be an edge system located at the edge of the network 130, and the target system 120 may be a core system located at the core of the network 130.

The source system collects data from different data sources 105A, 105B, and 105C. This data may include time series data streams, time-stamped images, video streams, etc. Although three data sources 105A, 105B and 105C are shown, it should be appreciated that there may be any number of data sources from which the source system 110 collects data.

Also, although one source system 110 is shown in FIG. 1, it should be appreciated that, more commonly, multiple source systems may provide subsets of collected data to the target system 120. This may be further understood with reference to FIG. 4, which is described in further detail below.

The source system 110 and the target system 120 include respective processors 112, 122 and respective computer readable mediums 114, 124. The processors 112, 122 may each include a microcontroller, a microprocessor, central processing unit core(s), an application-specific integrated circuit (ASIC), a field programmable gate array (FPGA), etc. The terminology "computer-readable medium" and variants thereof, as used in the specification and claims, includes non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed.

Each of the processors 112, 122 may execute instructions (i.e., programming or software code) stored on the computer readable mediums 114, 124, respectively.

Additionally, or alternatively, each of the processors 112, 122 may include electronic circuitry for performing the functionality of instructions described herein.

In one example, the source system 110 and the target system 120 operate respective data virtualization platforms 115, 126. The data virtualization platform 115 may be maintained on the source system 110 by the processor 112 executing software instructions stored on the computer readable medium 114. The data virtualization platform 126 may be maintained on the target system 120 by the processor 122 executing software instructions stored on the computer readable medium 124. In some implementations, instructions stored on the computer readable mediums 114, 124 described herein may be integrated in the software instructions executed to operate the data virtualization platforms 115, 126.

The data virtualization platforms 115 and 126 may abstract aspects of the physical storage hardware on which the data is physically stored (e.g., aspects such as addressing, configurations, etc.,) and present virtualized or logical storage to a user environment (e.g., operating system, applications, processes). The virtualized storage may be pooled from multiple storage hardware (e.g., hard disk drives, solid state drives, etc.). The data virtualization platforms may also provide data services such as deduplication, compression, replication, and the like.

The data virtualization platforms 115, 126 store collected data from the different data sources 105A, 105B and 105C in one or more data stores 119A, 119B, and 119C. The collected data from the different data sources 105A, 105B and 105C may be stored so that data from each data source is associated with other data collected from that same data source.

In one example, different file extensions or different directories may be used to identify data collected from the different data sources 105A, 105B, and 105C. Also, different file extensions or different directories may be used to identify different types of data collected from the different data sources 105A, 105B, and 105C.

In another example, data collected from the data sources 105A, 105B, and 105C is stored in data stores 119A, 119B, and 119C respectively associated with the data sources 105A, 105B, and 105C. Data collected from the same data source is stored in the same data store. In one example, the processor 112 generates respective series of snapshots 116, 117, and 118 of the collected data stored in the data stores 119A, 119B and 119C respectively associated with the data sources 105A, 105B, and 105C. In addition or instead, the processor 112 may generate self-contained snapshots, each of the snapshots being associated with one of the data sources 105A, 105B, or 105C.

In one example, the processor 112 generates the respective series of snapshots 116, 117, and 118 at fixed time intervals, e.g., every hour, every fifteen minutes, etc. The processor 112 may also generate the respective series of snapshots at variable time intervals. For example, the processor 112 may generate the snapshots 116, 117, and 118 in response to detecting a large difference in collected data, the difference being new or changed data.

The snapshots have respective associated time references T1, T2, T3, T4, T5, T6. The time references associated with the snapshots 116, 117, and 118 may correspond to timestamps of the collected data, with some variation. Due, for example, to a delay in collecting data from the data sources 105A, 105B, and 105C, the timestamps of the collected data may differ somewhat from the time references associated with the snapshots 116, 117, and 118. Thus, time reference adjustments may be made with respect to the time references of the series of snapshots 116, 117, and 118 so that they correspond to the timestamps of the collected data.

The series of snapshots 116, 117, and 118 include data collected from respective data sources associated with the respective data stores 119A, 119B, and 119C. The series of snapshots 116, 117, and 118 are stored in the data virtualization platform 115 such that each snapshot is indexable by the associated time reference.

In one example, the series of snapshots 116, 117, 118 may be maintained as a list in the data virtualization platform 115. However, the number of snapshots may grow significantly over time as data is continuously collected from the data sources 105A, 105B, 105C (and perhaps new data sources). Accordingly, in another example, the time references of the snapshots may be stored sequentially so that locating snapshots for any time range is a matter of translation into a direct file offset lookup, where the offset is computed based on the first time reference of a snapshot in a snapshot series and the fixed time interval over which the series of snapshots are generated. In another example, for series of snapshots generated over variable time intervals, the time references of the snapshots may be maintained in a more general index searchable by time.

Responsive to a request from the target system 120 received via the network 130 for collected data associated with a time interval, the processor 112 generates a subset of the collected data. The request from the target system 120 may be for collected data from a specific data source. In the example shown in FIG. 1, the request may be for data collected from the data source 105A over a time interval that spans the time between time references T3-T5. In this scenario, the processor 112 generates a subset of the collected data using the series of snapshots 116 generated using the collected data from the data source 105A stored in the data store 119A.

The processor 112 determines a start snapshot and an end snapshot of the series of snapshots 116. The start snapshot and the end snapshot are determined as a pair of snapshots that have respective associated time references that are most closely spaced and are inclusive of the time interval. The processor 112 determines a difference in the data included in the end snapshot and the start snapshot. The subset of the collected data generated by the processor 112 includes the difference in the data included in the end snapshot and the start snapshot.

In the example shown in FIG. 1, the start snapshot is determined to be the snapshot of the series 116 that has the associated time reference T3, and the end snapshot is the snapshot that has the associated time reference T5. The subset of the collected data is the difference between the snapshot having the associated time reference T5 and the snapshot having the associated time reference T3. In this example, the processor 112 uses snapshot differencing to generate a subset of collected data Snapshot differencing may be further understood with reference to FIGS. 2A-2C, which are described in detail below.

In another example, the processor 112 may generate a point in time subset of the data collected by the source system 110 by determining snapshots having associated time references that are closest among the respective associated time references to the point in time. The point in time subset of the data collected by the source system 110 includes the difference between these snapshots.

The subset of the collected data is provided to the target system 120 via the network 130 as the difference between the start snapshot and the end snapshot. In the example shown in FIG. 1, the subset of the collected data 128 includes the difference between the start snapshot having the associated time reference T3 and the end snapshot having the associated time reference T5. The subset of the collected data 128 may, in turn, be stored in a data store 129 included in the data virtualization platform 126 of the target system 120.

As the source system 110 collects data, such data is appended to other collected data in the data stores 119A, 119B, and 119C. At some point, all the available space within the data stores 119A, 119B, and 119C may be consumed. At that point, the oldest data may be freed, and the space may be reclaimed to write new data, effectively overwriting the old data. In this case, the difference between two snapshots will include deletions as well as additions. Though deletions are irrelevant in terms of providing newly accumulated data, they must be accounted for. However, it would suffice for the source system 110 to only provide data that is added between the end snapshot and the start snapshot as the subset of collected data.

Although in the example described above, the target system 120 is provided with difference between an end snapshot and a start snapshot, the target system 120 may behave as if an entire last snapshot is present. That is, if the target system 120 needs additional data, e.g., data included in the start snapshot and not just the difference between the end snapshot and the start snapshot, the target system 120 may retrieve such data from the source system 110 on demand.

As noted above, the data virtualization platforms 115, 126 may be object-based, and the collected data may be stored as objects. User accessible files and directories may be made up of multiple objects. Each object may be identified by a signature (also referred to as an object fingerprint), which, in some implementations, may include a cryptographic hash of the content of that object. The signature can be correlated to a physical address (disk location) of the object's data in an object index.

Objects may be hierarchically related to a root object in an object tree (e.g., a Merkle tree) or any other hierarchical arrangement (e.g., directed acyclic graphs, etc.). The hierarchical arrangement of objects may be referred to as an instance. In the case of a hierarchical tree, the lowest level tree node of any branch (that is, most distant from the root object) is a data object that stores user data, also referred to as a leaf data object. The parent tree node of leaf data objects is a leaf metadata object that stores as its content the signatures of its child leaf data objects. The root and internal nodes of a tree may also be metadata objects that store as content the signatures of child objects. A metadata object may store a number of signatures that is at least equal to a branching factor of the hierarchical tree, so that it may hold the signatures of all of its child objects. In some examples, the data virtualization platform 115 may maintain multiple file system instances, and objects in the data stores 119A, 119B, and 119C may be referenced in one or more file system instances. The data virtualization platform 115 may export a file protocol mount point (e.g., an NFS or SMB mount point) by which an operating system on the source system 110 can access the storage provided by file system instances via the namespace of the file protocol.

With the collected data from the data sources 105A, 105B, and 105C stored as objects in the data stores 119A, 119B, and 119C, the series of snapshots 116, 117, and 118 may be generated such that each snapshot includes a root object having an associated time reference and objects having a hierarchical relationship to the root object. Responsive to a request from the target system 120 for data collected over a time interval from a data source 105A, the processor 112 determines a start snapshot and an end snapshot as a pair of snapshots having root objects with associated time references that are most closely spaced and are inclusive of the time interval. The processor 112 determines a difference between the objects included in the end snapshot and the objects included in the start snapshot and generates a subset of the collected data that corresponds to the difference between the objects included in the end snapshot and the objects included in the start snapshot. The subset of the collected data may be provided to the target system 120 as a subset of collected data 128 which may be organized as file system instances and stored as objects in the data store 129. The subset of collected data 128 may be considered a time slice of an object tree.

As noted above, the time references associated with the snapshots may correspond to timestamps of collected data. In the case in which the series of snapshots 116, 117, and 118 of the collected data are generated such that each snapshot includes a root object having an associated time reference, the snapshot root objects may be indexed by logging snapshot root objects along with the corresponding time stamp in a file, at a specified snapshot time. In another example, a time dimension index for the snapshot root objects may be maintained, allowing snapshot intervals to be variable and adaptive. As the timestamps are recorded in monotonically increasing order, the index is simple to maintain and may even be embedded in an underlying object tree layout (e.g., a Merkle tree layout).

Figure 2A:
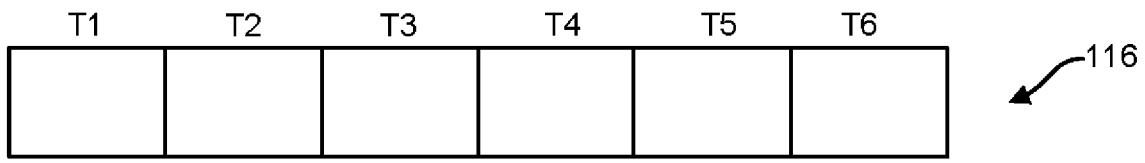
FIGS. 2A-2C depict an example of snapshot differencing, according to one or more examples of the disclosure.
Figure 2B:
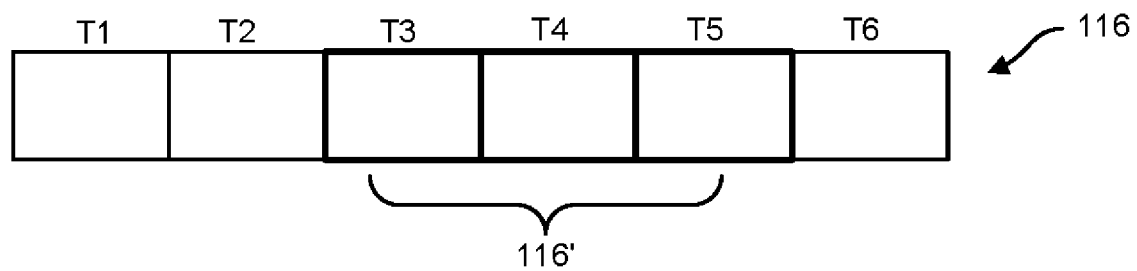
Figure 2C:
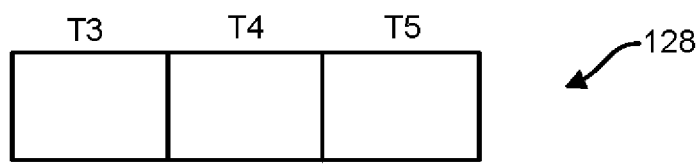

As noted above, the processor 112 of the source system 110 shown in FIG. 1 generates a subset of collected data using snapshot differencing. FIGS. 2A-2C depict an example of snapshot differencing according to one or more examples of the disclosure.

Referring to FIG. 2A, assume that a series of snapshots 116 having respective associated time references T1, T2, T3, T4, T5, and T6 is generated. Referring to FIG. 2B, assume that a request is received from the target system 120 for a subset of data collected over a time interval that fits within the time interval spanning the time references T3 to T5.

The time interval may not exactly match the time interval spanning the time references T3 to T5. For example, the snapshots may be generated every hour, e.g., from 8:00 AM to 1:00 PM, with the time references T1-T6 respectively corresponding to the hours from 8:00 AM to 1:00 PM. The request may be for data collected over a time interval from 10:30 AM to 11:30 AM. In this case, the time reference T3 of 10:00 am is the closest time reference to the start of the time interval that is not later than the start of the time interval. The time reference T5 of 12:00 PM is the closest time reference to the end of the time interval that is not earlier than the end of the time interval. The time references T3 and T5 are the most closely spaced time references that are inclusive of the time interval from 10:30 AM to 11:30 AM. Thus, the snapshot having the time reference T3 may be determined to be the start snapshot, and the snapshot having the time reference T5 may be determined to be the end snapshot. The subset of data is determined to include the difference between the data included in the start snapshot T3 and the end snapshot T5. This subset is denoted in FIG. 2B with the reference number 116'.

Referring to FIG. 2C, the subset of the collected data 128 includes the difference between the start snapshot having the time reference T3 and the end snapshot having the time reference T5. The difference includes any new or changed data between the end snapshot having the time reference T5 and the start snapshot having the time reference T3.

Although not shown, it should be appreciated that a point-in-time subset of data may be generated in a similar manner. For example, assume that a request for a subset of data collected at 9:30 AM is received. The processor 112 may generate a point in time subset of the data collected by the source system 110 by determining the difference between the snapshot having the time reference T2 of 9:00 AM and the snapshot having the time reference T3 of 10:00 AM. The point in time subset of the data collected by the source system 110 includes the difference between the snapshots having the time references T2 and T3.

Figure 3:
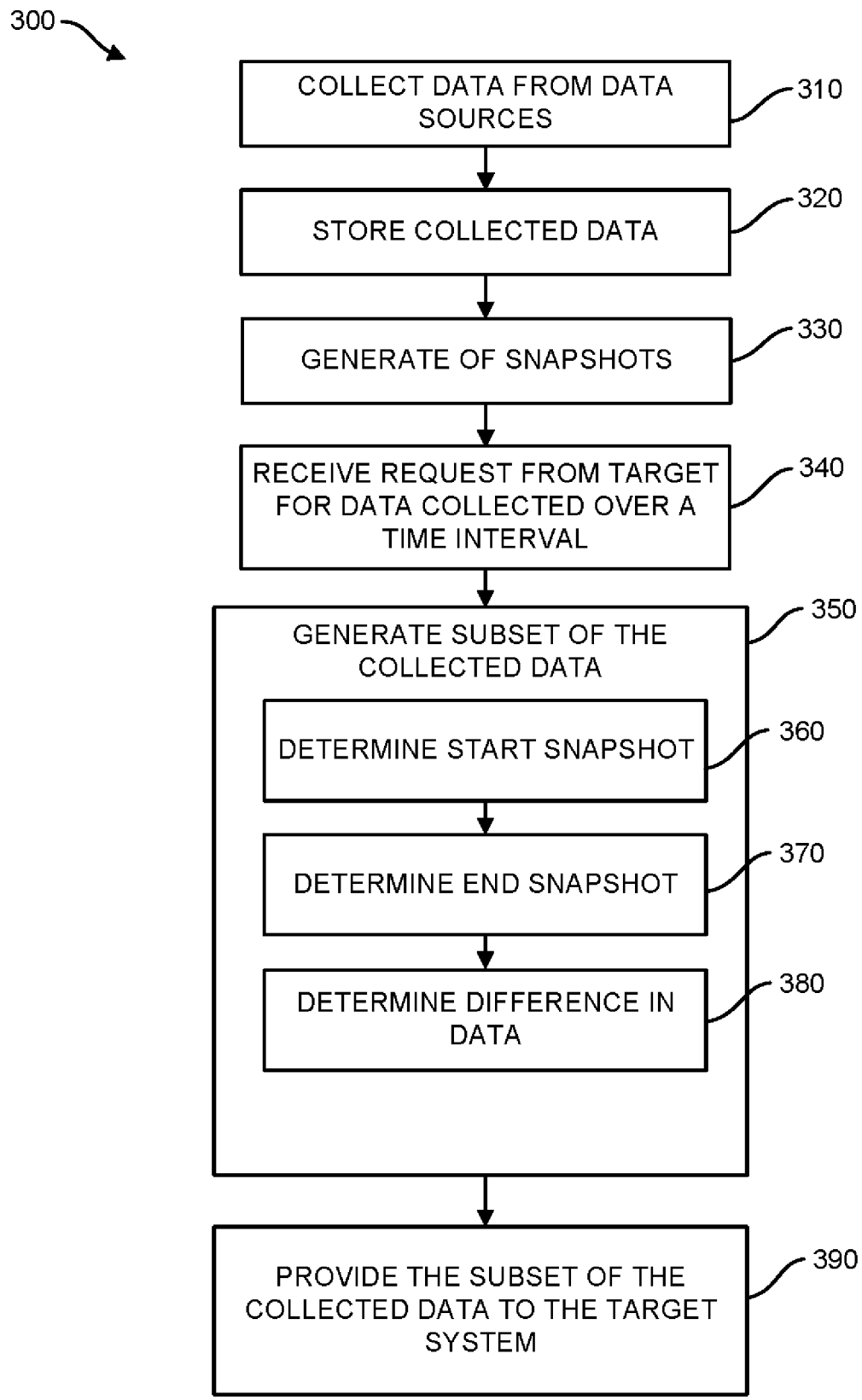
FIG. 3 is a flow chart showing a method for providing a subset of collected data from a source system to a target system, according to one or more examples of the disclosure.

FIG. 3 is a flowchart depicting a method 300 for providing a subset of collected data from a source system to a target system according to one or more examples of the disclosure. The method may be performed by, for example, the source system 110 in connection with the target system 120 shown in FIG. 1. As shown in FIG. 3, the method 300 includes collecting data from different data sources at 310. The collected data is stored at 320, for example, in data stores. Snapshots of the collected data are generated at 330. The snapshots may be generated as series of snapshots or as self-contained snapshots. The snapshots have respective associated time references. The snapshots may be generated at regular fixed time intervals or at variable time intervals.

A request is received from a target system for data collected from a data source over a time interval at 340. Responsive to the request, a subset of the data collected from the data source is generated at 350. The subset of data is generated by determining a start snapshot at 360 and determining an end snapshot at 370 The start snapshot and the end snapshot are determined as a pair of snapshots that have respective associated time references that are most closely spaced and are inclusive of the time interval. At 380, a difference in the data included in the end snapshot and the start snapshot is determined. The subset of the data collected includes the difference in the data included in end snapshot and the start snapshot. The subset of data is provided to the target system at 390.

Although not shown in FIG. 3, it should be appreciated that if the time reference associated with the end snapshot is the current time, a new snapshot may be generated, and the difference between the new snapshot and the end snapshot may be provided as the subset of data.

Figure 4:
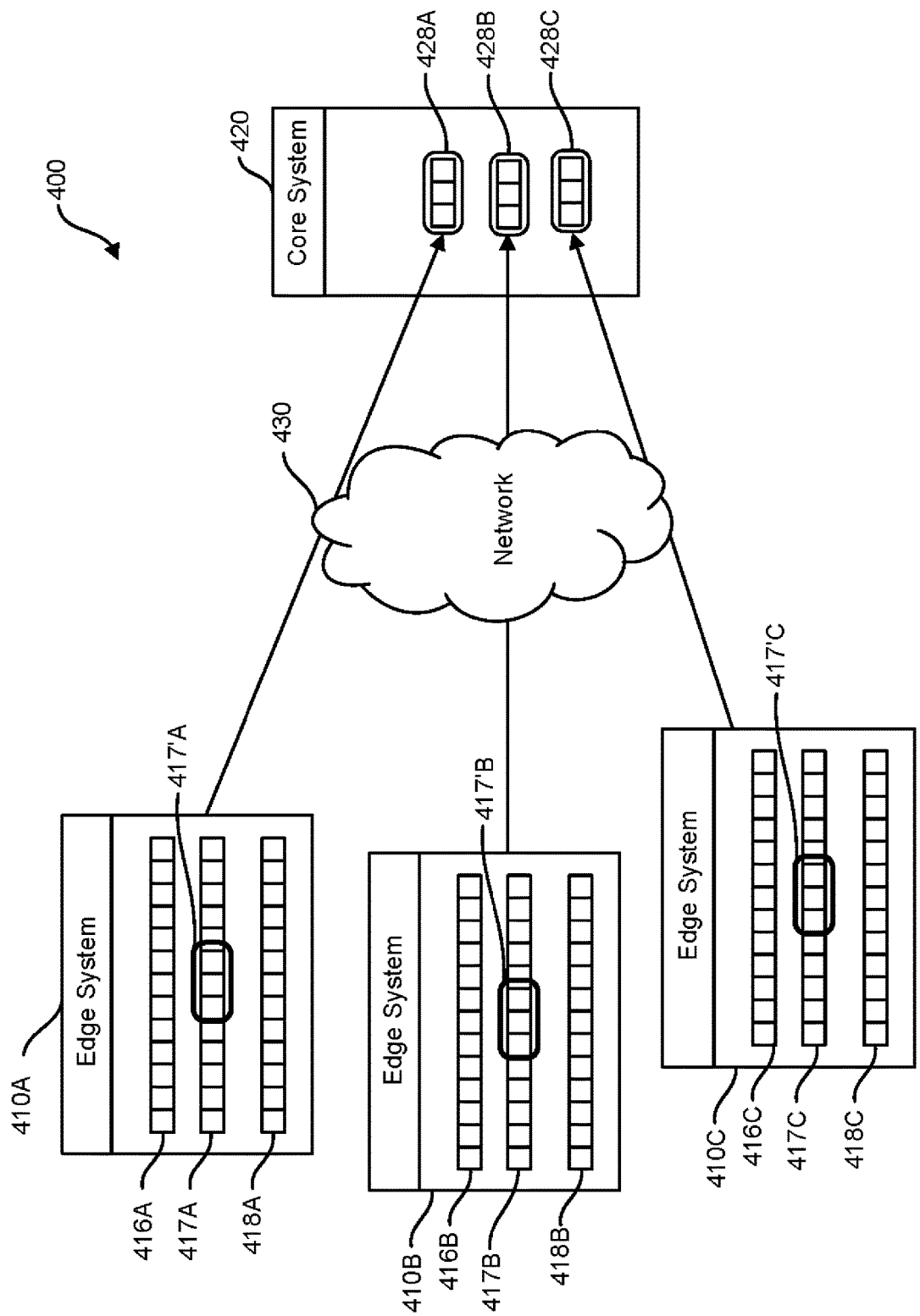
FIG. 4 conceptually illustrates a system including multiple edge systems and a core system, according to one or more examples of the disclosure.

FIG. 4 conceptually illustrates a system 400 including multiple edge systems and a core system according to one or more examples of the disclosure. Referring to FIG. 4, edge systems 410A, 410B, and 410C are remote source systems. Although three edge systems 410A, 410B, and 410C are shown, it should be appreciated that there may be any number of edge systems. The core system 420 is a central target system. While details of the edge systems 410A, 410B, and 410C and the core system 420 are omitted for the sake of brevity, it should be appreciated that the edge systems 410A, 410B and 410C may include similar components as the source system 110 shown in FIG. 1, and the core system 420 may include similar components as the target system 120 shown in FIG. 1.

The edge systems 410A, 410B, and 410C collect data from different types of data sources (not shown). In the example shown in FIG. 4, the edge system 410A generates series of snapshots 416A, 417A, 418A. The edge system 410B generates series of snapshots 416B, 417B, 418B. The edge system 410C generates series of snapshots 416C, 417C, 418C.

In one example, each of the series of snapshots generated by each of the edge systems 410A, 410B, and 410C is generated using collected data stored in data stores (not shown) respectively associated with different types of data sources. That is, the series of snapshots 416A, 416B, 416C are generated using collected data stored from a first type of data source, such as a video camera. The series of snapshots 417A, 417B, and 417C are generated using collected data stored for a second different type of data source, e.g., a smart appliance. The series of snapshots, 418A, 418B, and 418C are generated using collected data stored from a different third type of data source, e.g., a still camera.

Responsive to a request from the core system 420 for data collected over a time interval from a specific type of data source, the edge systems 410A, 410B, and 410C generate and provide respective subsets of the collected data from the specific type of data source to the core system 420. For example, as shown in FIG. 4, responsive to a request for a subset of data collected from the second data source, the edge systems 410A, 410B, and 410C generate and provide respective subsets of data including the difference between the respective end snapshots and the respective start snapshots of the respective series of snapshots 417A, 417B, and 417C. These subsets of data are indicated in FIG. 4 as subsets 417A', 417B', and 417C'. The subsets of data 417A', 417B', and 417C' are provided to the core system 420 and stored as subsets of data 428A, 428B, and 428C, respectively.

In this manner, the core system 420 is able to query the edge systems 410A, 410B, and 410C as a distributed storage system as it if the edge systems 410A, 410B, and 410C were a single storage system. Illustrative examples of queries from the core system 420 may include "List all jet engines for which this injector valve has partially stuck at least twice in the past 3 months", "List all security checkpoints where cardboard boxes of this size passed through the x-ray machine in the past two days", "List all vending machines where video footage shows a man wearing a red hoodie who purchased candy in the past week", "Provide five seconds of pre-roll and post-roll video footage for each red hoodie candy purchase", etc.

In one example, collected data from the edge systems 410A, 410B, and 410C may be aggregated by the core system 420 as an application level activity. That is, application programming interfaces (APIs) may be invoked to obtain the data collected by the edge systems 410A, 410B, and 410C.

In another example, the core system 420 may synthesize the collected data from the edge systems 410A, 410B, and 410C in a namespace, e.g., as the contents of a directory with the entries named by the edge systems 410A, 410B, and 410C, without invoking APIs. The file system namespace may be, for example, /sensorname/edgesitename/time or /sensorname>/<timerange>/<edgesitename>. The core system 420 may include a demuxer type for this purpose. The core system 420 may use a query-generated file name, e.g. /sensortype5/siteBoston3/time260820180930-280820181745 to specify a synthetic file. This synthetic file would fill with the contents of the data collected over the appropriate time interval. To avoid overwhelming the core system 420, some other gating of transfer of collected data, such as fill and prefetch on access, may also be used.

The edge systems 410A, 410B, 410C may include custom applications to process the data collected from different data sources and create higher-level data which may be stored and provided to the core system 420 upon request. That is, according to another example, the edge systems 410A, 410B, 410C may not only store data collected over time from different types of data sources in association with time references but may also store data collected from the different types of data source in association with the occurrence of a given condition. Illustrative examples of conditions for which collected data may be stored include: "When temperature exceeds a maximum threshold for more than five seconds, store the event 'max-temp' as a series of snapshots having associated time references"; "When patterns of a white cat are detected as an event, store the event "white cat in frame" as a series of snapshots having associated time references"; and "When patterns of a large truck at a front gate is detected as an event store the event "large truck at gate" as a series of snapshots having associated time references".

To aid in understanding of how a subset of collected data from a specific type of data source is generated and provided to the core system 420, consider a request from the core system 420 to "List all vending machines where video footage shows a man wearing a red hoodie who purchased candy in the past week". The core system 420 may also request "Show five seconds of pre-roll and post-roll video footage for each red hoodie candy purchase". This sort of request may be made, for example, to review footage of an individual that was spotting wearing a red hoodie and buying an item from a vending machine around the same time a crime occurred in an area having a number of different vending machines.

If the edge systems 410A, 410B, 410C are not already generating series of snapshots of collected "red hoodie detections at vending machines", the edge systems 410A, 410B, 410C will generate series of snapshots for "red hoody purchased at vending machines" detected over the past week. Once the series of snapshots are generated, each of the edge systems 410A, 410B, 410C will generate a subset of the collected data to provide to the core system 420 using the techniques described above. Each subset will include at least five seconds of pre-roll video footage of a purchase, video footage of the actual purchase, and five seconds of post-roll video footage of the purchase. The subsets of the collected data are provided as series of snapshots to the core system 420.

According to illustrative examples, data collected and processed by one or more edge systems 410A, 410B, 410C may be provided to the core system 420 for continuous global monitoring and analysis. Further, some selection of curated collected data may be pushed to the core system 420 for consolidated processing or deep learning. Models generated by learning from this data may also be referenced by time. Updated models may get pushed to the edge systems 410A, 410B, 410C (e.g. after re-training based on new data using transfer learning), while the ability is retained to revert to an old model as appropriate. Most of the data collected from the data sources could remain at the edge systems 410A, 410B, 410C as long as it is possible to selectively pull, inspect, or analysis subsets of the collected data.

As can be seen from the examples described above, the core system 420 is provided a window into the collected data stored at the edge systems 410A, 410B, 410C, as if the edge systems 410A, 410B, 410C and the core system 420 were operating as a single system, irrespective of where the collected data actually physically resides. This creates the illusion that data is both stored and processed at the core system 420, while in fact it is stored and processed at one or more of the edge systems 410A, 410B, 410C concurrently.

Although the examples above describe movement of subsets of collected data from one or more of the edge systems 410A, 410B, 410C to the core system 420, the same principles may apply to move subsets of collected data from one of edge systems 410A, 410B, 410C to another edge system or from the core system 420 to one or more of the edge systems 410A, 410B, 410C. That is, rather than sending subsets of collected data from the edge systems 410A, 410B, 410C to the core system 420, functions may be shipped to one or more edge systems 410A, 410B, 410C that have spare cycles to avoid the expensive transfer of the collected data, while providing a view of that collected data from the core system 420. Subsets of collected data residing at one or more of the edge systems 410A, 410B, 410C or the core system 420 may be accessible on-demand irrespective of where the data is present with minimal movement of unnecessary data. The principles described above may apply on any arbitrary topology of nodes where snapshots of data collected on each node or a subset of the nodes may be generated, and data collected over a time range may be transmitted from one node to another.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method comprising:
    receiving video collected by a video sensor;
    periodically generating a tree snapshot having an associated time reference, wherein the associated time reference is used to index the tree snapshot in a hierarchical arrangement;
    responsive to a request from a target system for data collected over a time interval, generating a tree of data representing the time interval by:
        determining a start snapshot tree of the time interval;
        determining an end snapshot tree of the time interval, wherein the start snapshot tree and the end snapshot tree are determined such that they are most closely spaced to and inclusive of the time interval; and
        determining a difference in the data included in the end snapshot tree compared to the start snapshot tree; and
    providing the difference in the data included in the end snapshot tree compared to the start snapshot tree to the target system, wherein the target system behaves as if an entire snapshot is present.

2. The method of claim 1, wherein the source system is an edge system, and the target system is a core system.

3. The method of claim 1, wherein the start snapshot has an associated time reference that is not later than the start of the time interval, and the end snapshot has an associated time reference that is not earlier then the end of the time interval.

4. The method of claim 1, wherein the snapshots are generated at fixed time intervals.

5. The method of claim 1, wherein the snapshots are generated at variable time intervals.

6. The method of claim 1, wherein the snapshots are generated as series of snapshots or as self-contained data.

7. The method of claim 1, further comprising:
receiving a series of snapshots generated by one or more edge systems, wherein the series of snapshots is generated using collected data from different types of data sources that include at least two of: a video camera, a smart appliance, and a still camera.

8. The method of claim 1, further comprising:
receiving a series of snapshots generated by one or more edge systems, wherein the series of snapshots is generated using collected data from different types of data sources that include at least two different file extensions and the series of snapshots includes the at least two different file extensions.

9. The method of claim 1, further comprising:
determining a root object of the hierarchical arrangement, wherein the root object comprises leaf metadata that stores signatures of child leaf data objects; and
associating the tree snapshot with the root object.

10. A system comprising:
at least one source system to provide collected data to a target system, the at least one source system including:
a computer readable medium to store computer readable instructions; and a processor to execute the computer readable instructions stored on the computer-readable medium to:
receive video collected by a video sensor;
periodically generate a tree snapshot having an associated time reference, wherein the associated time reference is used to index the tree snapshot in a hierarchical arrangement;
responsive to a request from a target system for collected data associated with a time interval, generate a tree of data representing the time interval by:
determining a start snapshot tree of the time interval;
determining an end snapshot tree of the time interval, wherein the start snapshot tree and the end snapshot tree are determined such that they are most closely spaced to and inclusive of the time interval; and
determining a difference in the data included in the end snapshot tree compared to the start snapshot tree, wherein the at least one source system is to provide the tree of data representing the time interval to the target system; and
provide the difference in the data included in the end snapshot tree compared to the start snapshot tree to the target system, wherein the target system behaves as if an entire snapshot is present.

11. The system of claim 10, wherein the collected data includes at least one of time series data, video streams, and time-stamped images.

12. The system of claim 10, wherein the source system is an edge system, and the target system is a core system.

13. The system of claim 12, further comprising multiple edge systems to collect data from different types of data sources and provide respective subsets of the collected data from a specific type of data source to the core system.

14. The system of clam 13, wherein the core system synthesizes the respective subsets of the collected data from the multiple edge systems in a namespace.

15. The system of claim 10, wherein the start snapshot has an associated time reference that is not later than the start of the time interval, and the end snapshot has an associated time reference that is not earlier then the end of the time interval.

16. The system of claim 10, wherein the snapshots are generated at fixed time intervals or at variable time intervals.

17. A non-transitory computer readable medium comprising computer executable instructions stored thereon that, when executed by a processor in a source system, cause the processor to:
receive video collected by a video sensor;
periodically generate a tree snapshot having an associated time reference, wherein the associated time reference is used to index the tree snapshot in a hierarchical arrangement; and
responsive to a request from a target system for data collected over a time interval, generate a tree of data representing the time interval by:
determining a start snapshot tree of the time interval;
determining an end snapshot tree of the time interval, wherein the start snapshot tree and the end snapshot tree are determined such that they are most closely spaced to and inclusive of the time interval; and
determining a difference in the data included in the end snapshot tree compared to the start snapshot tree; and
provide the difference in the data included in the end snapshot tree compared to the start snapshot tree to the target system, wherein the target system behaves as if an entire snapshot is present.

18. The non-transitory computer readable medium of claim 17, further comprising instructions stored thereon that, when executed by the processor, cause the processor to generate the series of snapshots at fixed intervals or variable intervals.

19. The non-transitory computer readable medium of claim 17, further comprising instructions stored thereon that, when executed by the processor, cause the processor to:
generate respective series of snapshots of the data, each of the respective series of snapshots including snapshots of data collected from the same data source.

* * * * *